(12) United States Patent
Jessen

(10) Patent No.: US 9,785,385 B2
(45) Date of Patent: Oct. 10, 2017

(54) MECHANISM FOR TRACKING PRINTER RESOURCE OBJECTS

(75) Inventor: Robert Frederic Jessen, Berthoud, CO (US)

(73) Assignee: RICOH COMPANY, LTD., Tokyo (JP)

( * ) Notice: Subject to any disclaimer, the term of this patent is extended or adjusted under 35 U.S.C. 154(b) by 1366 days.

(21) Appl. No.: 12/782,033

(22) Filed: May 18, 2010

(65) Prior Publication Data

US 2011/0286031 A1 Nov. 24, 2011

(51) Int. Cl.
*G06F 3/12* (2006.01)
*G06K 15/02* (2006.01)

(52) U.S. Cl.
CPC .......... *G06F 3/1218* (2013.01); *G06F 3/1239* (2013.01); *G06F 3/1247* (2013.01); *G06F 3/1285* (2013.01); *G06K 15/1803* (2013.01); *G06K 15/1827* (2013.01)

(58) Field of Classification Search
CPC .................................................. G06K 15/1822
See application file for complete search history.

(56) References Cited

U.S. PATENT DOCUMENTS

| | | | |
|---|---|---|---|
| 6,202,092 B1 | 3/2001 | Takimoto | |
| 7,394,568 B1 * | 7/2008 | Aschenbrenner et al. | 358/2.1 |
| 7,446,895 B2 | 11/2008 | Eden et al. | |
| 7,505,172 B2 | 3/2009 | Vondran, Jr. et al. | |
| 2004/0080772 A1 | 4/2004 | Snyders | |
| 2008/0186528 A1 | 8/2008 | Doose et al. | |
| 2009/0265286 A1 * | 10/2009 | Nagarajan | 705/400 |
| 2009/0268233 A1 | 10/2009 | Thomas et al. | |

* cited by examiner

*Primary Examiner* — Thomas Lett
(74) *Attorney, Agent, or Firm* — Alpine Technology Law Group LLC

(57) ABSTRACT

A method is disclosed. The method includes receiving print job data at a printing system, tracking resource objects in print job data while the print job data is rasterized to generate rasterized print data and updating a count of resource objects for print job data confirmed as printed.

23 Claims, 5 Drawing Sheets

| OBJECT ID | JOB ID | SUB-JOB ID | STATEMENT ID | CUSTOMER ID | RASTERIZER ID | LOGICAL PAGE |
|---|---|---|---|---|---|---|
| 1234 | 4567 | ABCD | 2133 | 9340 | 02020 | 202 |
| 1235 | 4567 | ABCD | 0430 | 6093 | 02020 | 204 |
| 1234 | 7640 | BDEE | 9201 | 3202 | 9939 | 409 |

Figure 4A

| OBJECT ID | JOB ID | SUB-JOB ID | STATEMENT ID | CUSTOMER ID | RASTERIZER ID | LOGICAL PAGE | PRINT ENGINE ID | PHYSICAL PAGE | PRINT DATE/TIME | CONFIRMED PRE/POST PROCESSED |
|---|---|---|---|---|---|---|---|---|---|---|
| 1234 | 4567 | ABCD | 2133 | 9340 | 02020 | 202 | 9392 | 45 | 201002151201 | Y |
| 1235 | 4567 | ABCD | 0430 | 6093 | 02020 | 204 | 9392 | 46 | 201002151201 | Y |
| 1234 | 7640 | BDEE | 9201 | 3202 | 9939 | 409 | 7630 | 74 | 201002152222 | Y |

Figure 4B

| ADVERTISER NAME | COMPLETED MEDIA PRINT | PRINT OBJECT ID (CLICK TO VIEW OBJECT) | TOTAL UNIQUE CUSTOMER STATEMENTS CONFIRMED PRINTED WITH THE PRINT OBJECT (CLICK TO SEE AUDIT DETAILS) |
|---|---|---|---|
| PANDA | FEBRUARY 2010 VISA STATEMENTS | 1234 | 102932 |
| PANDA | FEBRUARY 2010 VISA STATEMENTS | 1235 | 112003 |
|  |  | TOTALS=> | 214935 |

Figure 4C

MECHANISM FOR TRACKING PRINTER RESOURCE OBJECTS

FIELD OF THE INVENTION

The invention relates to the field of printing systems, and in particular, to printer resource objects.

BACKGROUND

Print systems include presentation architectures that are provided for representing documents in a data format that is independent of the methods that are utilized to capture or create those documents. One example of a presentation system is the (Advanced Function Presentation) AFP™ system developed by International Business Machines Corporation.

AFP includes resource objects having data and control information used to execute print jobs. According to the AFP system, documents may include combinations of text, image, graphics, and/or bar code objects in device and resolution independent formats. Documents may also include and/or reference fonts, overlays, and other resource objects, which are required at presentation time to present the data properly.

In various applications, there may be a need for tracking the printing of resource objects. For instance, administrators may be inclined to track sensitive resource objects. Such sensitive objects may include copyright images, special fonts, coupons, logos, watermarks, certification marks, and signatures (e.g., a company executive's handwriting signature image). Thus, by tracking the printing of individual resource objects, opportunities exist for usage monitoring, auditing, accounting, integrity checking and improved archiving.

Current resource object tracking methods include tracking the objects at the host or server level. However, tracking resource objects at the host or server level neglects information regarding what was actually printed. Multiple resource object occurrences in a document, multiple print jobs using shared resource objects, printers driven by multiple hosts (without the benefit of a common printer server), resource object substitutions by the printer and printers that generate hardcopy without tight control from the host (e.g., print jobs stored on the printer and printed on demand by the end user at the printer) are examples of situations where it is difficult for the host to have accurate resource object usage information.

Therefore, a method to track an actual number of occurrences a resource object has been printed would be desirable.

SUMMARY

In one embodiment a printing system is disclosed. The printing system includes a printer controller to receive print job data and a print engine to print the rasterized print data on a medium. The printer controller includes a rasterizer to rasterize the print job data to generate rasterized print data and to collect resource object occurrence data in the print job data during rasterization of the print job data and a print auditor to process printing process status data and to receive the resource object occurrence data from the rasterizer and to update the count of resource objects for print job data confirmed as printed.

In another embodiment, a method discloses receiving print job data at a printing system, tracking resource objects in print job data while the print job data is rasterized to generate rasterized print data and updating a count of resource objects for print job data confirmed as printed.

BRIEF DESCRIPTION OF THE DRAWINGS

A better understanding of the present invention can be obtained from the following detailed description in conjunction with the following drawings, in which:

FIGS. 4A-4C illustrate embodiments of resource object data collection; and

DETAILED DESCRIPTION

A mechanism for tracking the occurrence of resource objects is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
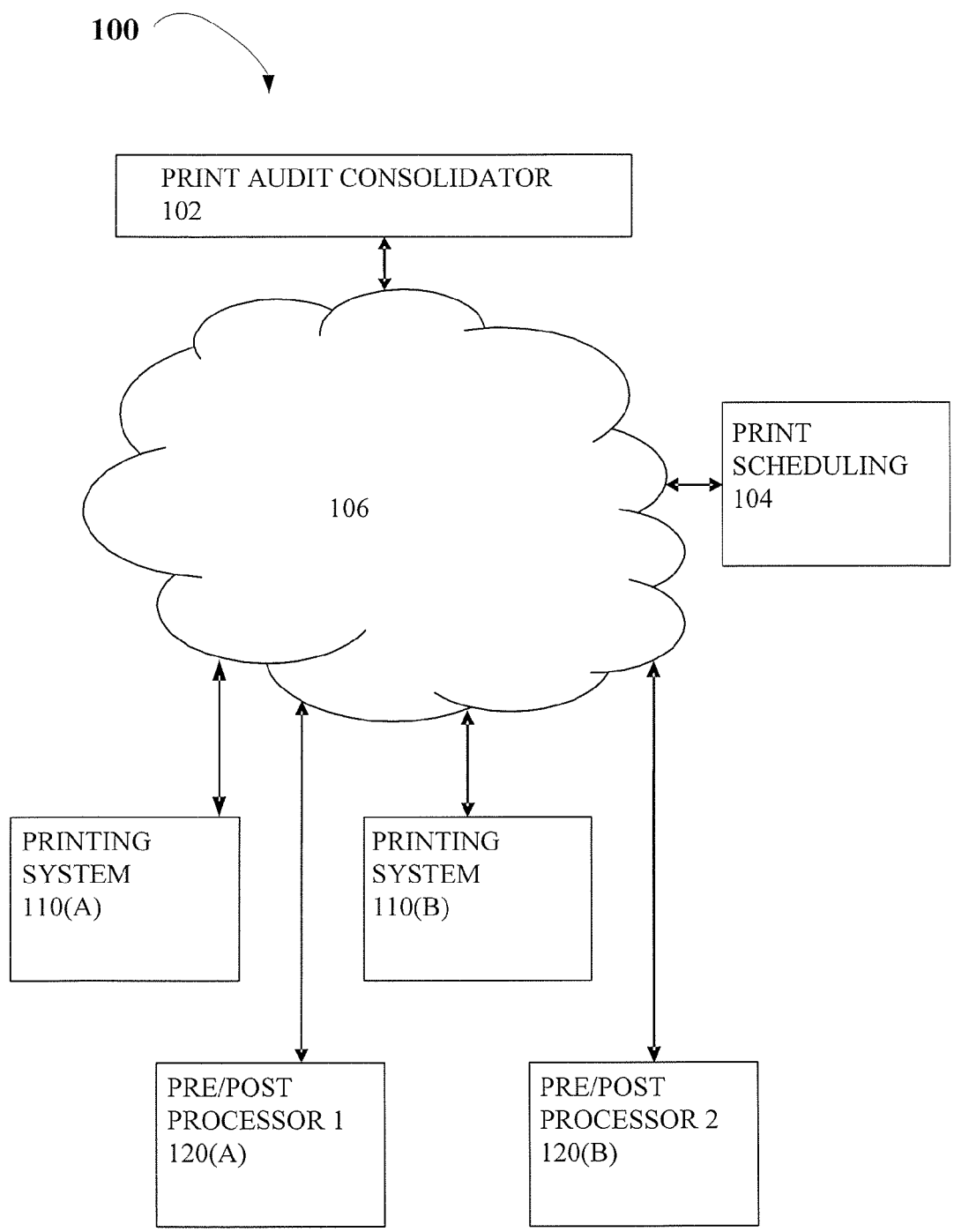
FIG. 1 illustrates one embodiment of a printing network.

FIG. 1 illustrates one embodiment of a printer network 100. Printer network 100 includes a print audit consolidator server 102, print scheduling server 104, printing systems 110 and pre/post processors 120, all coupled to network 106. Print audit consolidator server 102 gathers data from the plurality of printers 110 and pre/post-processing devices and consolidates the resource object occurrence information for presentation.

Print scheduling server 104 schedules print jobs at printing systems 110. In one embodiment, scheduling server 104 includes a print application that allows print service requests at printing systems 110. In a further embodiment, the print application implements the AFP presentation system. However in other embodiments, additional/alternative presentation architectures may be implemented at the print application.

Figure 2:
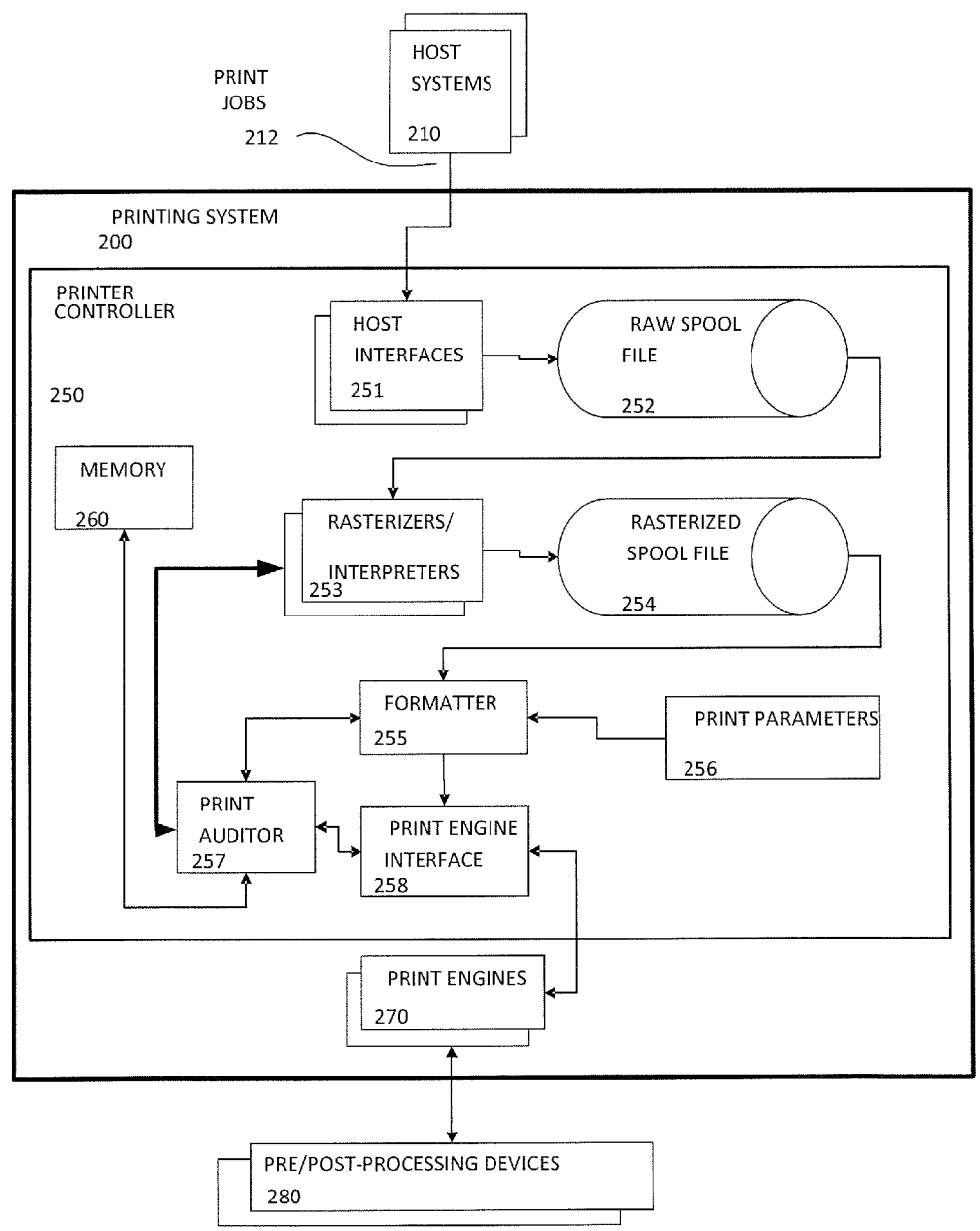
FIG. 2 illustrates one embodiment of a printing system.

FIG. 2 is a block diagram illustrating one embodiment of a printing system 200 and pre/post processing device 280 representative of printing systems 110 and pre/post processors 120, respectively, shown in FIG. 1. Printing system 200 is a system used to provide marks on a media, such as a continuous forms printer or a cut sheet page printer. Printing system 200 may include any digital hardcopy output device, such as printers, copiers, multifunction printers (MFP's) and facsimiles.

In one embodiment, printing system 200 is shared by multiple users. In such an embodiment, printing system 200 includes a printer controller 250 and one or more print engines 270. Printer controller 250 may include any system, server, or components operable to interface one or more host systems 210 with one or more print engines 270, and to control the printing of print jobs received from the host systems 210. Print engines 270 provide an imaging process to mark a printable medium, such as paper.

Printer controller 250 includes one or more host interfaces 251 that receive print jobs into printing system 200. Once received, the raw print jobs are transferred to raw spool file 252. Rasterizers/interpreters 253 receive the raw print job, interpret page description languages of the raw print job and generate logical print pages in a bit map (e.g., rasterized) format.

In one embodiment, rasterizers/interpreters 253 collects object occurrence data as a part of the rasterization process. In a further embodiment, rasterizers/interpreters 253 match printed resource occurrences to resource identification (e.g. name and type) so that the tracking data references a host defined resource identification. In such an embodiment, an Object Identification (OID) resource naming structure is implemented. However, other resource naming structures (e.g., Uniform Resource Indicator (URI)) may be implemented. The matching of resource occurrences to resource identifications enables a separate count to be maintained for each identified resource object.

Rasterized print jobs are provided to formatter 255 via a rasterized spool file 254. Formatter 255 positions logical pages appropriately for imaging on paper according to parameters provided by print parameters 256. In one embodiment, the formatted images are forwarded to a print engine 270 by way of a print engine interface 258. Print engines 270 mark the images on paper and communicates with pre/post-processors 280. Pre/post-processors 280 provide post processing that follows the imaging of printing system 280, such as cutting, binding, stapling, collating, etc.

Print auditor 257 receives and processes printing process status data received from formatter 255 and print engine interface 258 to insure that an entire print job has successfully printed. In one embodiment, print auditor 257 may store this status information in memory 260. In a further embodiment, print auditor 257 receives print object occurrence data gathered by rasterizer/interpreter 253. In such an embodiment, print auditor 257 uses the print object occurrence data (or resource tracking file) for each print job and increments print object print count (and other information) as each page of a job is confirmed as printed.

Figure 3:
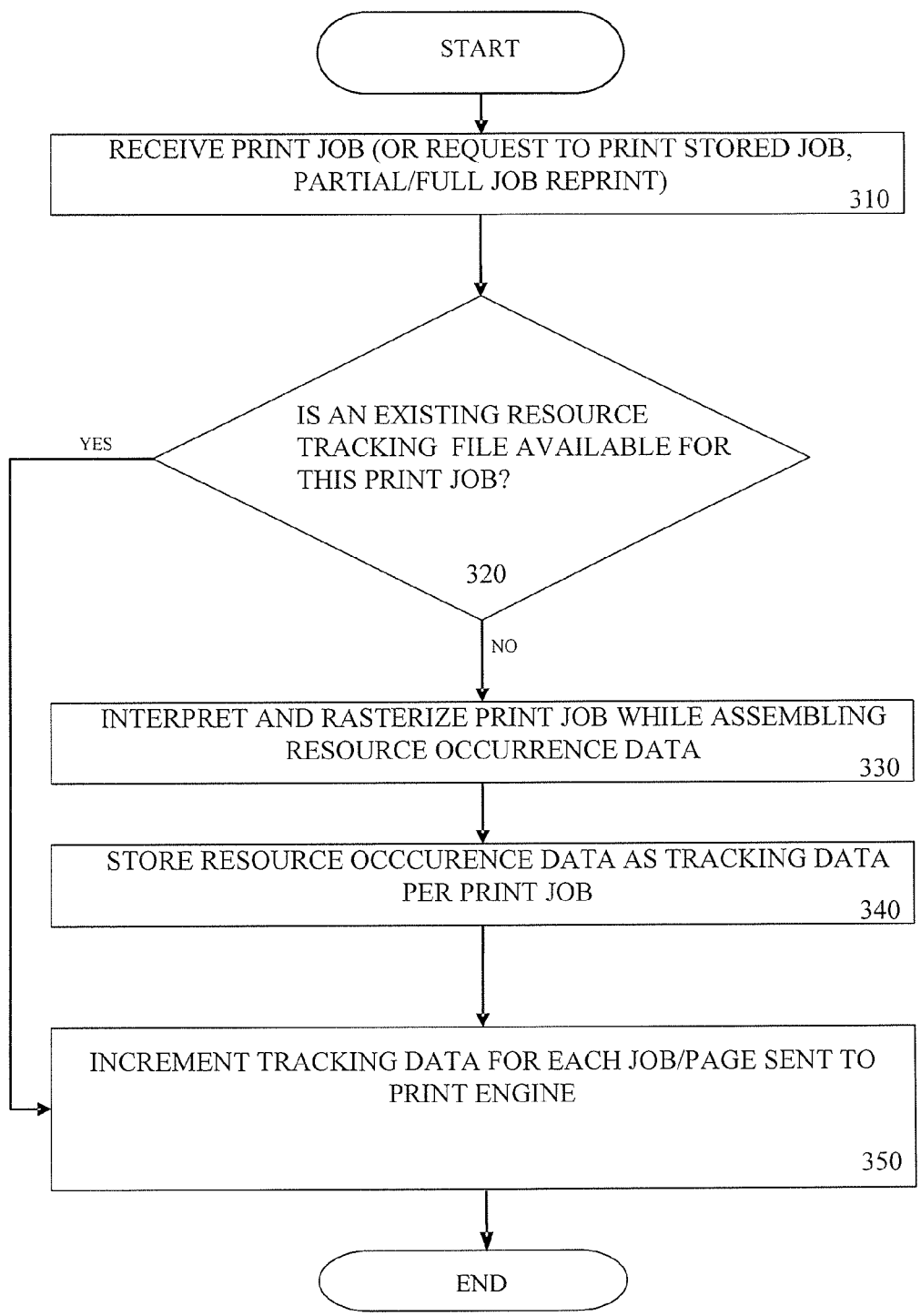
FIG. 3 is a flow diagram illustrating one embodiment of print object occurrence data collection.

FIG. 3 is a flow diagram illustrating one embodiment of print object occurrence data collection performed at printer controller 250. At processing block 310, a print job is received at printer controller 250. However, in other embodiments, the request may be a request to print a stored job, partial/full job reprint. At decision block 320, a determination is made as to whether an existing resource tracking file is available for the print job. If no resource tracking file exists, resource object occurrence data is assembled while the print job is interpreted and rasterized, processing block 330.

At processing block 340, resource occurrence data is stored as tracking data per print job. In one embodiment, tracking is implemented by counting the number of occurrences of each resource object per hardcopy print job, storing that information and then incrementing the count with each printed copy of the print job. However, tracking may be implemented at the print job level where more than one occurrence of the resource objects only count as one occurrence.

Once resource occurrence data is stored as tracking data, or if at decision block 320 it is determined that an existing resource tracking file is available for the print job, tracking data for each job/page sent to print engines 270 is incremented, processing block 350. According to one embodiment, tracking data is further modified appropriately for additional printed print job copies, lost pages, reprints, or error recovery by print auditor 257.

In a further embodiment, criteria can be set at printer controller 250 as to which resources, and under what circumstances, they are tracked. In such an embodiment, one setting may indicate that all resources are to be tracked, while another setting limits the tracking to resources meeting predefined tracking criteria. Thus, tracking criteria may be set before printing and changed as needed. For example, if an administrator is only interested in resources that are image files, the criteria is set for image files to be tracked, while all other resources are not tracked. Another example is may include tracking only resources for print jobs with OID that match a name template with wildcards allowed.

In one embodiment, tracking data may be manually reset at printer controller 250, with command from a host 212 or by tracking criteria. Further, tracking data may include one or more of the following additional information associated with a print object (e.g., data associated with the print object or devices that handle the print object): Print Object ID, Print Job ID, Sub-Job ID, Statement ID, Customer ID, Rasterizer ID, Logical Page ID, Print Engine ID, Physical Page ID, Print date/time, Print Operator ID, Server ID, Type of print (reprint, copy, held job, offline, diagnostic, etc.), Print Object source (download, cache, captured, etc), resource access time, resource size, etc.

FIGS. 4A-4C illustrate embodiments of resource object data collection. FIG. 4A illustrates one embodiment of resource object data collected during rasterization. As shown in FIG. 4A, data for Print Object ID, Print Job ID, Sub-Job ID, Statement ID, Customer ID, Rasterizer ID and Logical Page ID is collected. FIG. 4B illustrates one embodiment of resource object data collected for each printing system 200.

Data subset A shown in FIG. 4B is the same as shown in FIG. 4A. Data subset B includes object data collected after the print job is printed. This includes data for Print Engine ID, Physical Page ID and Print date. Data subset C includes data confirming an object has been pre/post-processed. FIG. 4C illustrates one embodiment of resource object data consolidated at print audit consolidator 102 from different printing systems 110.

In one embodiment, tracking information may be retrieved from print audit consolidator 102 by a host (or other device) using various existing means like protocols (e.g. SNMP, TCP/IP, FTP, HTTP, email, etc), conduits (e.g. WAN, LAN, PC Serial, PC Parallel, IEEE1394, USB, 802.11x, etc.) in various formats (e.g. MIB, XML, CSV, etc). In a further embodiment, the information may also be printed by printing systems 110, displayed on a display at a printing system 200 or available at a web page.

The above described tracking mechanism enables tracking data for various applications. One such application includes auditing and accounting information for billing associated with print occurrences. Particularly, the collected data provides for proper auditing, traceability of the print object handling information which aids directly in accounting and billing. For example, in the case of a copyrighted image where the image owner authorizes printing with payment for each print occurrence, the collected data may be used to determine a number of times a copyrighted image was printed so that proper credits can be made. Another example includes using the data to determine what print resources have been used within a time period on that printer in instances of a printer with stored print jobs or print jobs received from different hosts.

Another application for the above-described mechanism is for monitoring for appropriate resource object usage within guidelines. For instance, the collected data may be used for regulatory compliance as it relates to safeguarding documents and fiscal responsibility (e.g., the Sarbanes Oxley Act and the printing of financial documents). The data may also be used to confirm at the printer level that a sensitive watermark is being used only for authorized print jobs, or that all targeted jobs indeed use the watermark.

Further, the collection of resource objects may be used for print integrity confirmation. In such an embodiment, a determination may be made as to which printer resources were actually used at the printer level in the printing of the original print job. This would include resource object substitutions by the printer for which the host is unaware. Resource object collection may also be used for print archive information to determine which printer resources were actually used at the printer level in the printing of the original print job so that the job can be re-printed accurately in a rigorous manner. In yet another embodiment, the mechanism may be used for print efficiency (e.g., review actual print resources (and other saved attributes) used to print a print job to identify performance improvements through print resource optimization).

Figure 5:
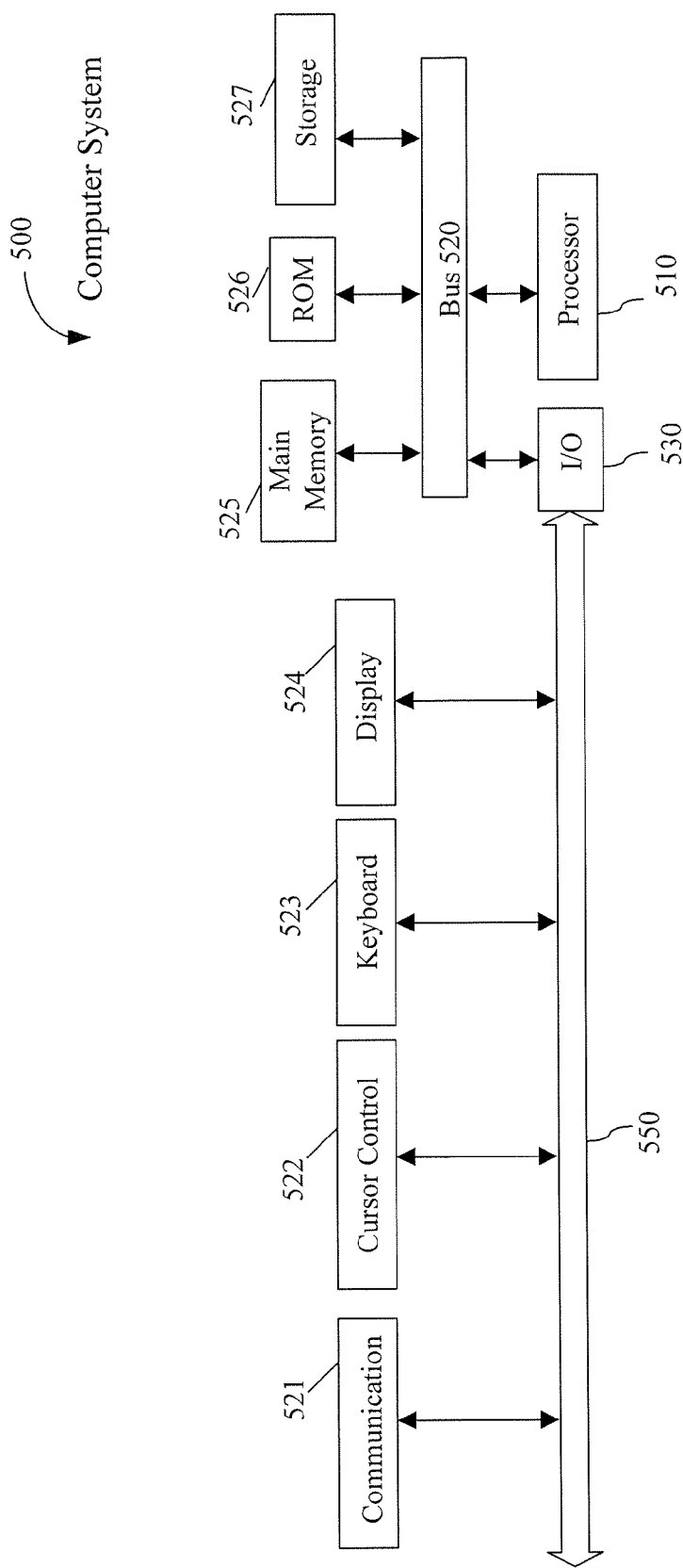
FIG. 5 illustrates one embodiment of a computer system.

FIG. 5 illustrates a computer system 500 on which printing systems 200 and/or hosts 210 may be implemented. Computer system 500 includes a system bus 520 for communicating information, and a processor 510 coupled to bus 520 for processing information.

Computer system 500 further comprises a random access memory (RAM) or other dynamic storage device 525 (referred to herein as main memory), coupled to bus 520 for storing information and instructions to be executed by processor 510. Main memory 525 also may be used for storing temporary variables or other intermediate information during execution of instructions by processor 510. Computer system 500 also may include a read only memory (ROM) and or other static storage device 526 coupled to bus 520 for storing static information and instructions used by processor 510.

A data storage device 525 such as a magnetic disk or optical disc and its corresponding drive may also be coupled to computer system 500 for storing information and instructions. Computer system 500 can also be coupled to a second I/O bus 550 via an I/O interface 530. A plurality of I/O devices may be coupled to I/O bus 550, including a display device 524, an input device (e.g., an alphanumeric input device 523 and or a cursor control device 522). The communication device 521 is for accessing other computers (servers or clients). The communication device 521 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A printing system comprising:
a printer controller to receive Page Description Language (PDL) print job data, including:
a rasterizer to rasterize the print job data to generate rasterized print data and to collect PDL resource object occurrence data in the print job data during rasterization of the print job data; and
a print auditor to process printing process status data and to receive the PDL resource object occurrence data collected by the rasterizer during the rasterization of the print job data and to update a count of resource objects for print job data confirmed as printed; and
a print engine to print the rasterized print data on a medium.

2. The printing system of claim 1 wherein the rasterizer matches each resource object to a resource identification to maintain a separate count for each identified resource object.

3. The printing system of claim 2 wherein matching each resource object to a resource identification enables tracking each resource object to a host that submitted the print job data.

4. The printing system of claim 2 wherein the resource identification includes an Object Identification (OID) resource naming structure.

5. The printing system of claim 2 wherein the resource identification includes a Uniform Resource Indicator (URI) resource naming structure.

6. The printing system of claim 2 wherein tracking data for a resource object includes at least one of Print Object ID, Print Job ID, Sub-Job ID, Statement ID, Customer ID, Rasterizer ID, Logical Page ID, Print Engine ID, Physical Page ID, Print date/time, Print Operator ID, Server ID, Type of print (reprint, copy, held job, offline, diagnostic, etc.), Print Object source (download, cache, captured, etc), resource access time and resource size.

7. The printing system of claim 1 wherein the print auditor increments a count for each resource object in rasterized data forwarded to the print engine.

8. The printing system of claim 7 wherein the print auditor increments the count for each resource object for each copy of rasterized data printed at the print engine.

9. The printing system of claim 7 wherein the print auditor decrements the count for each resource object on a rasterized page lost at the print engine.

10. The printing system of claim 1 wherein the rasterizer tracks all resource objects in the print job data.

11. The printing system of claim 1 wherein the rasterizer tracks only resource objects matching a predetermined criteria.

12. A method comprising:
receiving print job data at a printing system;
receiving Page Description Language (PDL) print job data at a printing system;
tracking PDL resource objects in print job data during the rasterization of the print job data to generate rasterized print data; and
updating a count of resource objects for print job data confirmed as printed.

13. The method of claim 12 further comprising determining if an existing resource tracking file is available for the print job data.

14. The method of claim 13 further comprising assembling resource object occurrence data while the print job data is rasterized if an existing resource tracking file is not available for the print job data.

15. The method of claim 12 wherein each resource object is matched to a resource identification to maintain a separate count for each identified resource object.

16. The method of claim 12 wherein updating the count of resource objects comprises incrementing the count for each resource object forwarded for printing.

17. The method of claim 16 wherein updating the count of resource objects comprises incrementing the count for each resource object for each copy of rasterized data printed.

18. The method of claim 16 wherein updating the count of resource objects comprises decrementing the count for each resource object on a lost rasterized page.

19. An article of manufacture comprising a machine-readable medium including data that, when accessed by a machine, cause the machine to perform operations comprising:

receiving print job data at a printing system;
tracking resource objects in print job data while the print job data is rasterized to generate rasterized print data; and
updating a count of resource objects for print job data confirmed as printed.

20. The article of manufacture of claim 19 including data that, when accessed by a machine, cause the machine to further perform operations comprising determining if an existing resource tracking file is available for the print job data.

21. The article of manufacture of claim 20 including data that, when accessed by a machine, cause the machine to further perform operations comprising assembling resource object occurrence data while the print job data is rasterized if an existing resource tracking file is not available for the print job data.

22. A printing network comprising:
a first printing system to track first Page Description Language (PDL) resource object data during rasterization of first print data and to update a count of the first resource object data confirmed as printed;
a second printing system to track second PDL resource object data during rasterization of second print data and to update the count of the second resource object data confirmed as printed; and
a print audit consolidator server to collect the first and second resource object data received from the first and second printing systems.

23. The printing network of claim 22 wherein the print audit consolidator server consolidates the first and second resource object data for presentation.

* * * * *